Jan. 16, 1968  R. C. FORREST  3,363,382
MESHING PANELS WITH INTERFITTING EXPANDABLE LOCKING STRIPS
Filed Sept. 3, 1965

INVENTOR.
Ronald C. Forrest
BY Earl D. Ayers
AGENT

United States Patent Office 3,363,382
Patented Jan. 16, 1968

3,363,382
MESHING PANELS WITH INTERFITTING
EXPANDABLE LOCKING STRIPS
Ronald C. Forrest, Saginaw, Mich., assignor to The Dow
Chemical Company, Midland, Mich., a corporation of
Delaware
Filed Sept. 3, 1965, Ser. No. 484,818
7 Claims. (Cl. 52—464)

ABSTRACT OF THE DISCLOSURE

The invention comprises modular panel joining means wherein panels whose edges have flanged strip parts at the bottom which mesh with one another, slanted edge walls, and channels near the top of edge surface. Locking elements, one being of generally V shaped transverse cross sectional configuration and the other being a strip adapted to engage the edge channels and the top of the V of the first mentioned locking element, are used to couple the panel edges together using screw means to tighten the locking elements together.

---

This invention relates to modular panels, and particularly to means for joining together such panels.

Modular panels are widely used to form lightweight aircraft landing mats, cargo pallets, and walls, floors and bulkheads of buildings, vehicles and aircraft, for example.

It is desirable that the assembly and disassembly of such panel type structures be accomplished rapidly and with as little handling of the panels as possible. Such panel modules may be constructed in a number of ways, but usually have top and bottom surfaces, separated by structural members, or a core of materials such as honeycomb, expanded plastics or metals, wood, etc. In common, such panel modules usually have extruded metal edges which play an integral part in the locking arrangement.

While various means for locking together such panel modules have been made, including snap-locks and sliding dove-tail assemblies, such means have been less successful than is desirable. Such locking means are usually not well adapted to permit rapid assembly or disassembly of the panels, rely only on friction contact to maintain the locked joint in position, do not firmly lock the joint against all the applied loads, or require excessive translation or rotation of the modules in order to join modules together.

Accordingly, a principal object of this invention is to provide an improved modular panel assembly which is adapted to be locked to similar assemblies.

Another object of this invention is to provide an improved panel locking assembly.

A further object of this invention is to provide an improved, rapid to use panel locking assembly.

Still another object of this invention is to provide an improved, simple to operate panel locking assembly.

Yet another object of this invention is to provide an improved panel locking assembly which rigidly holds panel structures in a fixed position when used.

In accordance with this invention modular panels are provided which have channels adjacent to opposite edges of a top (or bottom) surface, have an array of outwardly extending flanged strip parts extending away from the edge of the panel near the bottom (or top) of the panel, the flanged strip parts of one panel meshing with the flanged strip parts of the other panel, and have slanted edge walls (narrowing downwardly when panels are joined at edges) which have a shoulder near the surface having said channels therein. A pair of locking elements extend between adjacent panel edges. The upper element has flanged parts on its lower surface which engage the channels adjacent to each edge of each panel and has other flanges on the same side which engage the lower locking element. A locking strip disposed within the lower locking element is engaged by screws extending through the upper locking element. The lower locking element is generally V shaped in transverse cross-sectional configuration, with the open ends of the arms of the V bent inwardly near their upper end and then bent outwardly again at their upper end. The inwardly bent part is adapted, when the part is expanded, to bear against the shoulder on the edge wall while the outwardly bent parts engage said other flanges on the upper locking element. The closed end of the V of the lower locking element is disposed, in operative position, between the meshed flanges of the strip parts.

With two panels abutting, the upper and lower locking elements are assembled by sliding the locking strip inside the lower locking elements and then screwing the strip to the upper locking element. The locking elements are then placed between the abutting panels, the lower end of the lower element holding the bottom of the panels together and the upper element flanges engaging the channels in the upper surface of the panels. As the screws are tightened, the locking strip moves upwardly and forces the upper part of the lower element to expand to engage both the shoulder along the walls of the panels plus the other set of flanges on the under side of the upper locking element, holding the panels tightly together against loading from any direction.

The invention, as well as additional objects and advantages thereof, will best be understood when the following detailed description is read in connection with the accompanying drawings in which.

Figure 2:
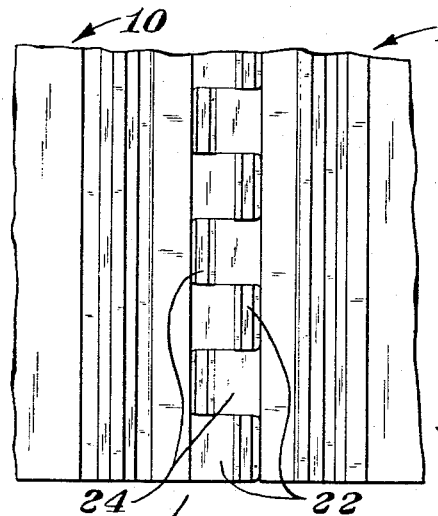
FIGURE 2 is a fragmentary plan view of panel assemblies made in accordance with this invention.
Figure 1:
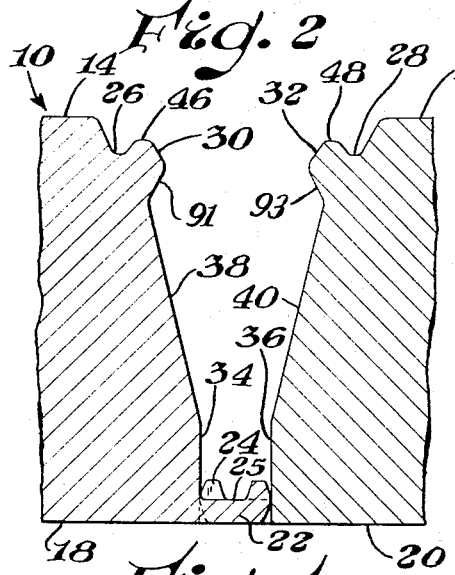
FIGURE 1 is a side elevational view, in section, of abutting panels made in accordance with this invention.

Referring to the drawing, and particularly to FIGS. 1 and 2, there is shown, in fragmentary form, a pair of panel elements, indicated generally by the numerals 10, 12, each having an upper surface 14, 16, respectively, and a bottom surface 18, 20, respectively.

The panel 10 has an array of outwardly extending elements 22 which have an upwardly extending flange near their outer ends. The elements 22, like the corresponding elements 24 of the panel 12, extend outwardly from the bottom of the panel. The outwardly extending elements 22, 24 are offset from one another so that they mesh together as the panels are placed in abutting relationship with respect to each other (as seen in FIG. 2). When the panels 10, 12 are in abutting relationship, the upwardly extending flanges on the elements 22, 24 are so disposed that a notch 25 apparently exists between them when viewed from the side.

Each of the panels 10, 12 has a channel 26, 28, respectively, in its top adjacent to the same edge from which the outwardly extending elements 22, 24 extend from the bottom part.

The edge walls of the panels 10, 12 which are adjacent to each other as the panels are joined rise vertically above the elements 22, 24 for a minor fraction of the thickness of the panels, and then are undercut to taper into the body of the panel for a length equal to a major fraction of the width of the panel. Near the top of the panel the edge wall tapers outwardly again, forming a shoulder 91, 93. Above the shoulders 91, 93 the wall tapers inwardly as at 30, 32 and forms ribs 46, 48 adjacent to the channels 26, 28 respectively. The ribs 46, 48 are below the top surface 14, 16 of the panel by a distance which usually is the thickness of the upper locking element 50 at the point where the upper locking element 50 contacts the rib.

The upper locking element 50 is an elongated strip having a flat upper surface 66 and having downwardly extending flanges 52, 54 along the lengthwise edge of the strip.

Figure 3:
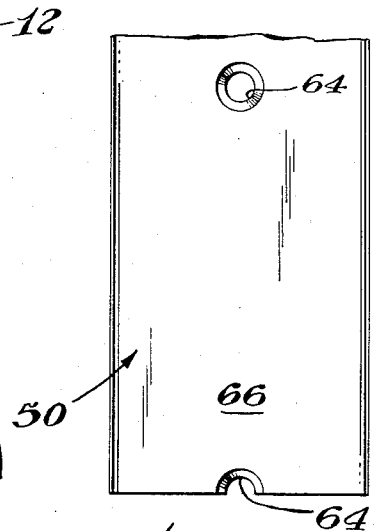
FIGURE 3 is a fragmentary plan view of a locking element in accordance with this invention.

The element 50 has a central part which is shaped, when viewed in transverse cross-section, as a regular trapezoid with its smaller parallel side having an undercut elongated slot therein. The undercut slot in the under side of the element 50 provides lips 56, 58 which face each other and make an acute angle with respect to the top surface 66 of the element 50. The element 50 contains a plurality of counter bored bores 64 at spaced apart intervals along its length (see FIG. 3).

A lower locking element, indicated generally by the numeral 80, is an elongated hollow member having a closed end 82 and an open end.

The member 80 is generally V shaped, when viewed in transverse cross-section, with the open upper end parts of the walls 88, 90 of the V turned inwardly near the end and then turned outwardly again at their end to provide lips 84, 86 which curve away from each other.

The walls 88, 90 of the element 80 are relatively thin and are sufficiently spring-like to be capable of being forced apart a substantial amount without breaking or being otherwise permanently deformed. The inward turn of the walls 88, 90 provides an internal sloping part 92, 94 against which force may be applied to force apart said walls 88, 90.

Figure 4:
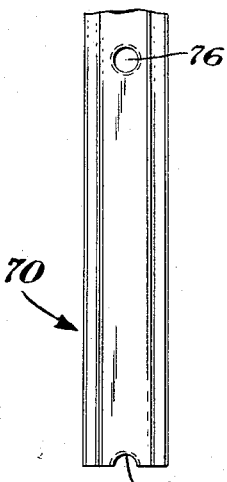
FIGURE 4 is a plan view of a locking strip made in accordance with this invention.

An elongated locking strip, indicated generally by the numeral 70 and shown in plan in FIG. 4, is disposed within the lower locking element 80. The strip 80 is generally trapezoidally shaped when viewed in transverse cross-section, with the large base of the trapezoid facing the bottom of the panel. The strip 70 has a plurality of spaced apart threaded bores 76 extending between its parallel surfaces. The strip 70 is composed of a metal core 72 clad with an outer layer 74 of, for example, material having a low coefficient of friction, resiliency, and high wear resistance. Nylon and polyethylene have been used as cladding materials, although other suitable materials may also be used.

Screws 68, which extend downwardly through the bores 64 in the locking element 50, engage the threaded bores 76 of the strip 70.

In operation the strip 70 is disposed within the lower locking element 80 and the upper locking element placed over the upper end of the element 80 and loosely coupled thereto by screws 68 engaging the strip 70.

Figure 5:
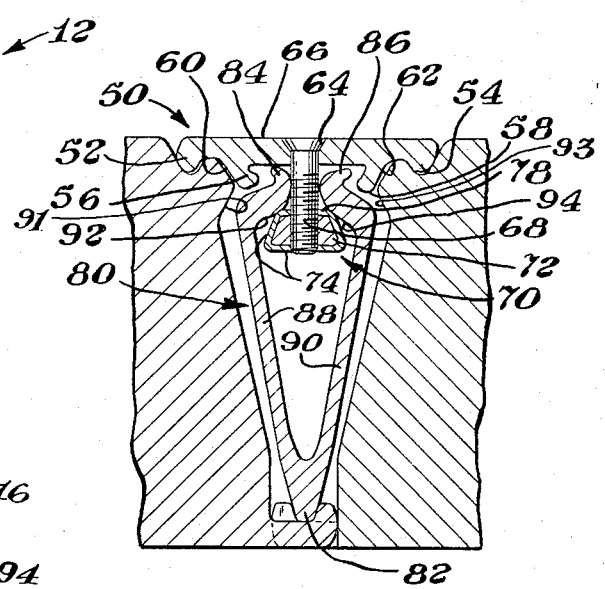
FIGURE 5 is a fragmentary side elevational view, in section, of panel joining assemblies in accordance with this invention.

The above-described loose assembly is then inserted, as illustrated in FIG. 5, into the space between abutting panels whose outwardly extending flanged elements 22, 24 are intermeshed. The lower end 82 of the lower locking element fits into the so-called notch 25 between the flanges of elements 22, 24.

The downwardly extending flanges 52, 54 on the lower surface of the upper locking strip 50 fit into the channels 26, 28 in the upper surface of each panel 10, 12. The side walls of the trapezoidal part of the underside of the locking element 50 bear against the inwardly tapering part 30, 32 of the panel walls while the bottom of the element 50 also bears against the ribs 46, 48.

To lock the panels 10, 12 together, the screws 68 are tightened, drawing the strip 70 towards the upper locking element and forcing apart the walls 88, 90 as the strip 70 moves against the inwardly extending shoulders 92, 94 of the lower locking element 80. As the walls 88, 90 of the element 80 are spread apart, the lips 84, 86 at the upper ends of the walls 88, 90 engage and lock with the lips 56, 58 of the locking element 50. At the same time the walls 88, 90 engage the shoulders 91, 93 on the edge walls of the panels 10, 12.

Figure 6:
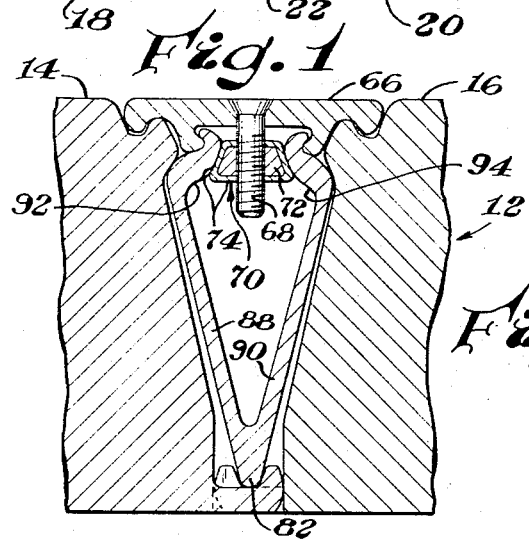
FIGURE 6 is a fragmentary side elevational view, in section, of panels joined together in accordance with this invention.

Thus, as shown in FIG. 6, with the screws 68 tightened, the panels 10, 12 are firmly and tightly joined together at both the top and bottom, with the locking assembly being anchored against the shoulders 91, 93 to prevent upward movement of the locking assembly (elements 50, 80 and strip 70).

Panels may be joined together in accordance with this invention easily, positively, and with the use of very simple tools and relatively unskilled labor.

A specially advantageous feature of this invention permits the removal of any panel from an assembly without moving any other panel in order to effect the removal, since the panels abut, but do not lay over one another at any point.

It is anticipated that the panels may be made from any suitable materials, but that the edges and locking assembly would be made of extruded metal alloys, such as light metals, for example. Aluminum and magnesium alloys have been successfully used.

What is claimed is:

1. Panel apparatus comprising: (a) a pair of panels having top, bottom, and edge wall parts, said panels being adapted to abut against one another along their edge wall parts, each of said panels having a walled channel in its top adjacent to but spaced from said edge wall surface and a rib in its top at said edge wall part, each of said panels also having at its bottom edge an array of outwardly extending elements which have an upwardly extending flange disposed at the outer end thereof, said outwardly extending elements being spaced apart from one another and offset from the corresponding outwardly extending elements of the panel adjacent thereto whereby said outwardly extending elements intermesh when said adjacent panels abut, and a sloping wall surface on said end part intermediate said top and bottom, said wall surface sloping inward from said rib and inward from above said outwardly extending elements to form an undercut surface; (b) an elongated top locking element having a top and bottom part, said bottom part having a pair of downwardly extending flanges thereon, said downwardly extending flanges being spaced apart a distance equal to the distance between said walled channels in the top of said panels when said panels abut against one another to be locked together, the lower part of said flanges being shaped to mate with said channels, and a wide channel having undercut walls, said wide channel being disposed between said downwardly extending flanges, said top locking element having a plurality of spaced apart bores extending therethrough along its length; (c) an elongated hollow lower locking element which has a closed end, an open end, wall elements joined at said closed end and extending progressively further apart over a major part of their length, then extending inwardly adjacent to but spaced from their upper, open ends and extending outwardly at the upper, open end of said locking element, the configuration of said outwardly extending upper end being such that, on said upper, open ends being spread apart, they grip the undercut wall of said wide channel of said top locking element, the inwardly extending part of said wall elements being adapted to, on said wall elements being forced apart, seat against the inwardly sloping wall part of said panel which is next adjacent to said ribs, and the length of said lower locking element being such that closed end of said lower locking element fits between said upwardly extending flanges of said outwardly extending elements of panels which are joined in meshed abutting relationship for locking together, and (d) means, including screws extending through the bores in said upper locking element and spreading the walls of said lower locking element and engaging the lower locking element with the undercut side wall surfaces of said panels and said undercut walls of said wide channel of said top locking element while said closed end of said lower locking element is held between the flanges of said outwardly extending elements of said panels.

2. Panel apparatus in accordance with claim 1, wherein said locking elements are made of metal.

3. Panel apparatus in accordance with claim 1, wherein said means for spreading the walls of said lower locking element includes a wedge-like strip coupled to said screws.

4. Panel apparatus in accordance with claim 3, wherein said wedge-like strip has a metal core and is clad with plastic material.

5. Panel apparatus in accordance with claim 1, wherein said ribs in the top of said panels lie below the rest of said top surface by a distance substantially equal to the thickness of said top locking element where said element bears against said rib.

6. Panel apparatus in accordance with claim 1, wherein said panel top and the top of said top locking element are substantially co-planar when said panels are locked together.

7. Panel apparatus in accordance with claim 1, wherein the part of said panels which are to be locked together are made of metal.

References Cited
UNITED STATES PATENTS

| | | | |
|---|---|---|---|
| 1,854,241 | 4/1932 | Adams | 52—584 X |
| 2,394,443 | 2/1946 | Guignon | 52—580 |
| 2,633,946 | 4/1953 | Huizenga | 52—620 |
| 2,962,133 | 11/1960 | Kivett et al. | 52—580 |
| 3,028,938 | 4/1962 | Schorr | 52—464 |

FRANK L. ABBOTT, *Primary Examiner.*

ALFRED C. PERHAM, *Examiner.*